United States Patent [19]

Kröckert et al.

[11] Patent Number: 5,199,986
[45] Date of Patent: Apr. 6, 1993

[54] PROCESS FOR COLORING BUILDING MATERIALS

[75] Inventors: Bernd Kröckert, Wesel; Günter Linde, Krefeld; Manfred Eitel, Krefeld; Kurt Schäfer, Krefeld; Klaus Rohbock, Kempen, all of Fed. Rep. of Germany

[73] Assignee: Bayer Aktiengesellschaft, Leverkusen, Fed. Rep. of Germany

[21] Appl. No.: 826,432

[22] Filed: Jan. 27, 1992

[30] Foreign Application Priority Data

Feb. 6, 1991 [DE] Fed. Rep. of Germany ....... 4103531

[51] Int. Cl.$^5$ .............................................. C04B 14/02
[52] U.S. Cl. ................................... 106/712; 106/459; 106/456
[58] Field of Search ............... 106/712, 425, 436, 453, 106/456

[56] References Cited

U.S. PATENT DOCUMENTS 4,134,725  1/1979  Büchel et al. ........................... 8/526
4,277,288  7/1981  Lawrence et al. ................... 106/413
4,946,505  7/1990  Jungk .................................. 106/712

FOREIGN PATENT DOCUMENTS 0365046   4/1990  European Pat. Off. .
0396975  11/1990  European Pat. Off. .
0482450   4/1992  European Pat. Off. .
2723221  12/1977  Fed. Rep. of Germany .
2940156   4/1980  Fed. Rep. of Germany .
3918694  10/1990  Fed. Rep. of Germany .
2438073   4/1980  France .

OTHER PUBLICATIONS

Sprechsaal, vol. 121, No. 2, "Neue Granuliertommel fur die Aufbaugglomeration", pp. 126–129, Dr. G. Heinze., Feb. 1988.

Primary Examiner—Karl Group
Assistant Examiner—Chris Gallo
Attorney, Agent, or Firm—Connolly & Hutz

[57] ABSTRACT

Colored building materials are produced by incorporating into the building materials inorganic pigments in the form of granulates which are free-flowing and not dust forming wherein the pigments are produced from spray dried granulates by after-granulating.

10 Claims, No Drawings

PROCESS FOR COLORING BUILDING MATERIALS

The present invention relates to a process for coloring building materials with inorganic pigments in the form of granulates which are free flowing and not dust forming.

BACKGROUND OF THE INVENTION

When cement- and lime-bonded building materials such as plaster, lime brick, fibre cement parts or concrete blocks, in particular roof tiles, paving stones or promenade tiles, are to be colored, the coloring materials used are generally inorganic pigments. The pigments conventionally used in the building materials industry are iron oxides or iron hydroxides for red, black, brown or yellow, manganese oxides for black-brown, chromium oxides for green and titanium dioxides for white. In addition, carbon blacks may be used as black pigments, nickel or chromium rutiles as yellow pigments, spinels containing cobalt as blue and green pigments, spinels containing copper as black pigments and mixed crystals of barium sulphate and barium manganate as blue pigments.

For coloring concrete materials, the pigments are generally used in powder form. When ground up as powders they have the advantage of being readily dispersible; such pigment powders can be distributed completely homogeneously in concrete mixtures within a short time of up to a few minutes. The disadvantage of these fine powders, however, is that they do not flow freely and in many cases cake together and form lumps when kept in storage. This renders accurate dosing difficult and another disadvantage of some powders is that they tend to form dust.

It is known that these disadvantages can be avoided in the pigmentation of concrete parts by using aqueous pigment suspensions instead of dry pigment powders. The use of such pastes or slurries containing 30 to 70% by weight of pigment, however, has only slowly become established as the additional water content may considerably increase the transport costs, depending on the distance between the place of manufacture and the building site. Moreover, not all concrete preparations are capable of absorbing the large quantity of water carried with the pigment.

The building materials industry has therefore for the most part continued to use dry pigment powders. The use of pigments in the form of microgranulates such as are commonly used in the plastics and lacquer industry has hitherto been prevented by the commonly held belief that granulates are not easily dispersible in concrete preparations. Pigment agglomerates which are not easily dispersible require substantially longer mixing times. In the short mixing times conventionally used in the manufacture of building materials, patches, streaks and nests of color occur on the surface of the concrete due to imperfect pigment distribution. The intensity of color contained in the pigment cannot fully develop, with the result that larger quantities of pigment are required for obtaining a given intensity of color in the concrete.

Pigment granulates consisting substantially of pigment and one or more binders which promote dispersion of the pigment in the concrete are described in DE-C 3 619 363 for coloring concrete. The following are mentioned there as binders which function as dispersing auxiliaries in concrete: Alkyl benzene sulphonates, alkyl naphthalene sulphonates, lignin sulphonate, sulphated polyglycol ethers, melamine formaldehyde condensates, naphthalene formaldehyde condensates, gluconic acid, salts of low molecular weight, partially esterified styrene/maleic acid anhydride copolymers and copolymers of vinyl acetate and crotonic acid. The proportion of these in the pigment should preferably be from 2 to 6% by weight.

The above-mentioned dispersing auxiliaries act as liquefiers in concrete mixtures. They influence the water-cement ratio and have an effect on the consistency of the concrete.

In the inorganic pigment itself, the added binders act as foreign organic substances. According to DE-A 2 950 156, the inorganic starting pigment has a resin content of at least 20%. Distribution of the granulates in concrete is rendered very difficult by the resin contents of hydrophobic agglomerates.

Pigments which are free-flowing and produce little dust can be produced according to DE-C 3 918 694 but the free-flowing character and the amount of dust formation are not entirely satisfactory due to the high proportion of particles smaller than 100 $\mu$m.

It is an object of the present invention to provide free-flowing, non-dust forming inorganic pigment granulates which are free from the above-described disadvantages of the state of the art for coloring building materials.

BRIEF DESCRIPTION OF THE INVENTION

Colored building materials are produced by incorporating into the building materials inorganic pigments in the form of granulates which are free-flowing and not dust forming wherein the pigments are produced from spray dried pigment granulates by after-granulating the spray dried pigment.

DETAILED DESCRIPTION

The problem encountered by the prior art was solved by a process for coloring building materials with inorganic pigments in the form of free-flowing, non-dust forming granulates, in which the pigment granulates were obtained from spray dried granules by after-granulating these for some time.

This process is the subject of the present invention. The granulates produced according to DE-C3 918 694 are suitable for the process according to the invention.

Particularly good results are obtained when the after-granulation is carried out for a period of from 5 minutes to 10 hours, preferably from 15 minutes to 2 hours.

It is surprisingly found that the granules do not break up under these conditions and the proportion of fine particles smaller than 100 $\mu$m is decreased and of particles larger than 100 $\mu$m is increased.

The process according to the invention may advantageously be carried out at a temperature from the ambient temperature to 300° C. The after-granulation is preferably carried out in drums, screws, rotary plates or similar apparatus. The after-granulated granules obtained are very free-flowing and produce substantially less dust than the granules put into the process.

In one embodiment of the process according to the invention, the after-granulation is carried out without any additive. Under certain conditions, the effect obtained by the process according to the invention may be assisted by spraying a few percent of water over the granule during the after-granulation.

In another embodiment of the process according to the invention, the granules are therefore sprayed with 0.5 to 5% by weight, preferably 1 to 3% by weight of water, based on the quantity of pigments, during the process of after-granulation.

It may be equally advantageous to spray the granules during the after-granulation with 0.5 to 5% by weight, preferably 1 to 3% by weight, based on the quantity of pigments, of aqueous solutions of salts of boron, aluminium, silicon, titanium, zinc and/or tin. This enables a further reduction in the content of fine particles smaller than 100 $\mu$m to be obtained.

It is particularly suitable to use inorganic pigments selected from one or more of the group comprising titanium dioxide, iron oxide, chromium oxide, manganese oxide and zinc oxide. Iron oxide pigments are particularly preferred.

In another embodiment of the process according to the invention, the inorganic pigments are mixed phase pigments containing at least two cations selected from the cations of chromium, manganese, iron, cobalt, nickel, zinc, titanium, copper, aluminium, arsenic and antimony, and oxygen as counter-ion.

It has been shown that the particle size of the granulates according to the invention should not exceed a particular value which depends on the pigment. This size depends primarily on the bulk density of the granulate, which in turn is a measure of the porosity of the particles. In the case of spray granulation, the porosity depends on the solids content of the pumpable starting suspension before drying, a value which may vary considerably in dependence upon the particle size and particle form of the pigment.

The compacted bulk density defined in DIN 53 194 of August 1957 serves as measure of the bulk density. The pigment granulates according to the invention are distinguished by the fact that they do not disintegrate during determination of the compacted bulk density. The granulates according to the invention preferably have a compacted bulk density of from 0.5 to 2.5 g/cm$^3$, most preferably from 0.8 to 1.5 g/cm$^3$.

The average particle size of granulates particularly suitable for the process according to the invention is from 100 to 500 $\mu$m.

Pigment granulates having this particle size are powders which are stable in handling and freely pourable, do not form dust and are very suitable for coloring building materials. Contrary to the previously held opinion (DE-C 3 619 3639), the shear forces acting on the granulates in concrete preparations are sufficient for complete dispersion of the pigment during the mixing cycle.

Particularly good results are obtained with iron oxide pigments.

The compacted bulk density of the granulates may vary according to the pigment, the type and quantity of additive and the water content of the suspension. If the compacted bulk density is too low, the granulates will be insufficiently stable, whereas granulates with high compacted bulk densities are difficult to disperse. The iron oxide black granulates according to the invention preferably have compacted bulk densities of from 0.8 to 1.4 g/cm$^3$.

The process according to the invention will now be explained more fully with the aid of the following Examples but must not be regarded as limited by the Examples.

The dispersibility in concrete was tested by measuring the color intensity of prisms produced with white cement conforming to the following data: Cement:-sharp sand ratio 1:4, water-cement value 0.35, level of pigmentation 1.2% based on the cement, mixer used: RK Toni Technik, Berlin, 5 l mixing dish, Model 1551, speed of rotation 140 revs/min (Batch: 500 g of cement). Four samples of mixture (300 g) were removed after 30, 40, 50, 60, 70 and 80 seconds and used to produce sample bodies (5$\times$10$\times$2.5 cm) under pressure (32.5 N/mm$^2$). Hardening of the samples: 24 hours at 30° C. and 95% relative humidity followed by drying at 50° C. for 24 hours. Colour data measured with Hunterlab apparatus: 3 measuring points on the upper and 3 on the under side, 24 measuring points per pigment mixture. The average values obtained are based on a sample obtained with a mixing time of 80 seconds (final color intensity=100%).

EXAMPLES

Example 1

An aqueous suspension containing about 50% by weight of Fe$_3$O$_4$ (Bayferrox® 318, Trade Product of Bayer AG) and 1% by weight of soda waterglass solution containing 360 g/l of SiO$_2$, based on the solids content, arrived at the distribution disc of a disc spray drier under a pressure of 0.5 bar. The circumferential velocity of the disc was 88 m/s. The combustion gases from the natural gas surface burner entered the spray drier at a temperature of 380° C. The discharge temperature of the gases was 75° C. 90 kg per hour of iron oxide black granules having a residual moisture content of 3.5% by weight were obtained. The compacted bulk density of the granules was 1.14 g/cm$^3$. Screen analysis of the granules showed that 23.7% of the granules were smaller than 100 $\mu$m and only 76.3% were greater than 100 $\mu$m.

Rolling of the resulting granules was continued, in the present Example in a tablet coating drum having a diameter of 80 cm and an angle of inclination of 45° C. and rotating at 25 revs/min. The granules obtained after 60 minutes were free-flowing and according to sieve analysis contained only 14% of particles smaller than 100 $\mu$m. The compacted bulk density was 1.18 g/cm$^3$. In the dispersibility test in concrete prisms, the final color intensity was obtained after 50 seconds.

Example 2

The granules from Example 1 containing 23.7% of particles smaller than 100 $\mu$m were after-rolled in the coating drum for one hour as in Example 1. In addition, they were sprayed during this time with 2% by weight of water, based on the solids content.

The granules then contained only 4.5% of particles smaller than 100 $\mu$m. The compacted bulk density was 1.22 g/cm$^3$. The flow was excellent and the amount of dust produced very slight. In the dispersibility test in concrete prisms, the final color intensity was obtained after 40 seconds.

Example 3

An aqueous suspension having a solids content of 55% by weight of iron oxide red (Bayferrox® 130, Trade Product of Bayer AG) reached the distribution disc of a disc spray drier under an initial pressure of 0.3 bar. The circumferential velocity of the disc was 75 m/s. The combustion gases from the natural gas surface burner entered the spray drier at a temperature of 400° C. The discharge temperature was 160° C. 125 kg per hour of iron oxide red granules having a residual moisture content of 0.3% by weight were obtained. The compacted bulk density was 148 g/cm³. Screen analysis, however, showed that 24.8% of the granules were smaller than 100 μm.

These granules were then after-rolled for 30 minutes as described in Example 1. This reduced the proportion of particles smaller than 100 μm to 13%. The flow was excellent and the amount of dust produced very slight. In the test for dispersibility in concrete prisms, the final color intensity was obtained after 70 seconds. The compacted bulk density was 1.40 g/cm³.

Example 4

The granules from Example 3 were sprayed with 1% by weight of water during the after-rolling. Granules containing less than 10% of particles below 100 μm were obtained after one hour. The flow and dust content were excellent. In the dispersibility test in concrete prisms, the final colour intensity was obtained after 60 seconds. The compacted bulk density was 1.41 g/cm³.

Example 5

Granules of iron oxide yellow were produced as described in Examples 1 and 3 (Bayferrox®420, Trade Product of Bayer AG). The compacted bulk density was 0.92 g/cm³ and the residual moisture content was 0.3% by weight. Screen analysis showed that 87.5% by weight of the particles were greater than 100 μm. These granules were kept at 190° C. in a rotary tube furnace for 30 minutes at a circumferential velocity of 4 revs/min. 98.8% by weight of the resulting granules were larger than 100 μm. The compacted bulk density was 0.96 g/cm³.

The final color intensity in the dispersibility test in concrete prisms was obtained after 50 seconds.

What is claimed is:

1. A process for coloring building materials with inorganic pigments which comprises incorporating into said materials pigments in the form of granulates which are free-flowing and no dust forming wherein the pigment granulates are produced from spray dried granules by after-granulating.

2. A process according to claim 1 wherein the after-granulation is carried out for a period of from 5 minutes to 10 hours.

3. A process according to claim 1 wherein the after-granulation is carried out at a temperature from ambient temperature to 300° C.

4. A process according to claim 1 wherein the after-granulation is carried out in drums, screws or rotary plates.

5. A process according to claim 1 wherein the after-granulation is carried out without any additive.

6. A process according to claim 1 wherein during after-granulation the granules are sprayed with 0.5 to 5% by weight of water, based on the quantity of pigments.

7. A process according to claim 1 wherein during after-granulation the granules are sprayed with 0.5 to 5% by weight of aqueous solutions of salts of boron, aluminum, silicon, titanium, zinc, tin or mixtures thereof, based on the quantity of pigments.

8. A process according to claim 1 wherein the inorganic pigments are at least one titanium dioxide, iron oxide, chromium oxide, manganese oxide or zinc oxide.

9. A process according to claim 8 wherein the inorganic pigments are iron oxide pigments.

10. A process according to claim 1 wherein the inorganic pigments are mixed phase pigments containing at least two metal cations selected from the metal group consisting of chromium, manganese, iron, cobalt, nickel, zinc, titanium, copper, aluminum, arsenic and antimony, together with the oxygen as the anion.

* * * * *